(12) United States Patent
Kodama

(10) Patent No.: US 6,665,592 B2
(45) Date of Patent: Dec. 16, 2003

(54) VEHICLE SURROUNDINGS MONITORING DEVICE

(75) Inventor: Katsuhisa Kodama, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 66 days.

(21) Appl. No.: 09/988,403

(22) Filed: Nov. 19, 2001

(65) Prior Publication Data
US 2002/0177927 A1 Nov. 28, 2002

(30) Foreign Application Priority Data
May 24, 2001 (JP) .................................. 2001-155809

(51) Int. Cl.$^7$ ................................................ B60R 1/00
(52) U.S. Cl. ........................ 701/1; 340/904; 342/70
(58) Field of Search ................. 701/1, 29; 343/872, 343/873; 340/903, 904; 342/70, 71, 72, 175; 361/600

(56) References Cited

U.S. PATENT DOCUMENTS

| 6,081,237 A | * | 6/2000 | Sato et al. | 343/713 |
| 6,243,024 B1 | * | 6/2001 | Yamabuchi et al. | 340/903 |
| 6,335,680 B1 | * | 1/2002 | Matsuoka | 340/435 |
| 6,424,892 B1 | * | 7/2002 | Matsuoka | 701/29 |
| 6,452,533 B1 | * | 9/2002 | Yamabuchi et al. | 342/70 |
| 2002/0175867 A1 | * | 11/2002 | Kodama | 343/713 |

FOREIGN PATENT DOCUMENTS

JP          54-45040 A          4/1979

OTHER PUBLICATIONS

Abstract JP54045040.

* cited by examiner

*Primary Examiner*—Gary Chin
(74) *Attorney, Agent, or Firm*—Sughrue Mion, PLLC

(57) ABSTRACT

A transmitting antenna (2) which is mounted in the interior of a door mirror of a vehicle and radiates transmitted waves through the surface of said door mirror, and a receiving antenna (3) that receives reflective waves from an object existing near the vehicle through the surface of said door mirror are rotated by a drive portion equipped within the door mirror. Also, the transmitting antenna and the receiving antenna are fixed to a support portion (15) that supports the surface of the door mirror; and the support portion is joined to the drive portion by a joint portion (14) and rotates vertically and horizontally with the joint portion (14) as a fulcrum, to thereby vertically and horizontally rotate the transmitting antenna (2) and the receiving antenna (3) with the joint portion as the fulcrum. Further, the support portion of the door mirror surface, the transmitting antenna and the receiving antenna are molded integrally.

4 Claims, 4 Drawing Sheets

VEHICLE SURROUNDINGS MONITORING DEVICE

This application is based on Application No. 2001-155809, filed in Japan on May 24, 2001, the contents of which are hereby incorporated by reference.

BACKGROUND OF THE INVENTION

1. Field of the Invention

The present invention relates to a vehicle surroundings monitoring device that is mounted on a vehicle and monitors the surroundings of a vehicle, and more particularly to a vehicle surroundings monitoring device that calls an alarm to a driver in order to prevent a contact and collision with an obstacle at the time of changing a lane or the like.

2. Description of the Related Art

A conventional vehicle surroundings monitoring device has been disclosed in, for example, Japanese Patent Application Laid-open No. Sho 54-45040. This vehicle surroundings monitoring device has a reflector in a mirror case so as to reflect electric waves radiated from a feeder phone antenna outside of a mirror toward the rear side of the vehicle. Also, the present applicant has disclosed a vehicle surroundings monitoring device mounted in the interior of the door mirror of the vehicle in Japanese Patent Application No. Hei 11-325688. This vehicle surroundings monitoring device includes: a transmitting circuit that generates waves to be transmitted; an antenna that radiates the transmitted waves through a mirror surface of the door mirror; and a receiving circuit that receives reflected waves from an object existing near the vehicle through the surface of the door mirror by the antenna, in which the wavelengths of a visible light is reflected onto the surface of the door mirror, and a reflective film through which electromagnetic waves of several G to 100 GHz can be transmitted is vapor-deposited on the surface of the door mirror.

However, in the case where the antenna disposed in the vicinity or the interior of the door mirror is fixed independently to the mirror case or a support portion for the door mirror surface as in the above-described conventional vehicle surroundings monitoring device, not only an additional mounting space is required to mount the antenna is excessively occupied, but also an angle of the antenna cannot be readily changed. Also, there is the possibility that the door mirror is damaged due to a contact of the antenna with the door mirror when the door mirror is rotated.

Also, similarly, even in the case where the reflective film through which the electromagnetic waves can be transmitted is vapor-deposited on the surface of the door mirror as described above, a reflection from a mirror base surface and a reflection due to the reflective film also occur to same degree. For that reason, the electric waves radiated from the transmitting antenna stray into the receiving antenna. The level of straying of the reflected waves greatly varies according to the relative positions of the mirror base material, the reflective film, and the antenna. In the case where the straying level of the reflected waves has changed significantly, when an obstacle actually exists at a short distance from the vehicle, the obstacle cannot be detected depending on the distance resolution of a radar, or the distance measuring performance is adversely affected by the fluctuation, whereby the possibility of an alarm failure or a false alarm becomes high.

SUMMARY OF THE INVENTION

The present invention has been made in order to solve the above problems, and therefore an object of the present invention is to provide a vehicle surroundings monitoring device which is capable of varying an angle of an antenna equipped within a door mirror, to thereby prevent a door mirror surface from being damaged due to a contact of the antenna with the door mirror.

Another object of the present invention is to provide a vehicle surroundings monitoring device which is capable of being downsized and improving the mounting property of the antenna in the door mirror.

Still another object of the present invention is to provide a vehicle surroundings monitoring device which is capable of reducing electric wave components that stray into a receiving antenna from a transmitting antenna to a predetermined level, to thereby prevent the distance measuring performance over a short distance from being deteriorated.

To achieve the above-described objects, according to one aspect of the present invention, there is provided a vehicle surroundings monitoring device which monitors surroundings of a vehicle, the device comprises: a transmitting antenna which is mounted in the interior of a door mirror of the vehicle and radiates transmitted waves through the surface of the door mirror; and a receiving antenna that receives reflective waves from an object existing near the vehicle through the surface of the door mirror, wherein the transmitting antenna and the receiving antenna are rotated by a drive portion equipped within the door mirror.

Also, the transmitting antenna and the receiving antenna are fixed to a support portion that supports the surface of the door mirror; and the support portion is joined to the drive portion by a joint portion and rotates vertically and horizontally with the joint portion as a fulcrum, to thereby vertically and horizontally rotate the transmitting antenna and the receiving antenna with the joint portion as the fulcrum.

Further the support portion of the door mirror surface, the transmitting antenna and the receiving antenna are molded integrally.

Furthermore, according to another aspect of the present invention, there is provided a vehicle surroundings monitoring device which monitors surroundings of a vehicle, the device comprises: a transmitting antenna which is mounted in the interior of a door mirror of a vehicle and radiates transmitted waves through the surface of the door mirror; and a receiving antenna that receives reflective waves from an object existing near the vehicle through the surface of the door mirror, wherein the support portion of the door mirror surface, the transmitting antenna and the receiving antenna are molded integrally.

Still further, the transmitting antenna and the receiving antenna are disposed at positions where the reflection from the door mirror surface becomes minimum.

Finally, a distance d of from the opening surfaces of the transmitting antenna and the receiving antenna to the door mirror surface is set to $\lambda/2$ ($\lambda$ is a wavelength) or more.

DESCRIPTION OF THE PREFERRED EMBODIMENTS

First Embodiment

Figure 1:
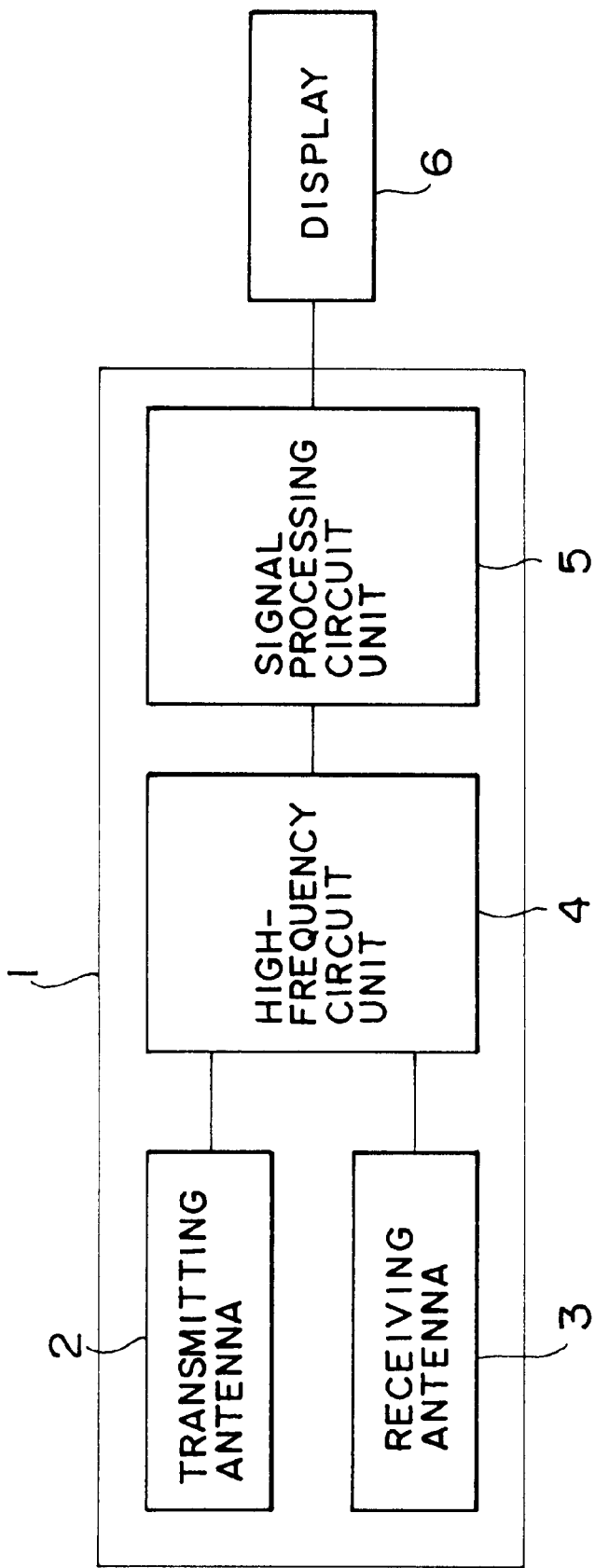
FIG. 1 is a block diagram showing a structure of a vehicle surroundings monitoring device in accordance with a first embodiment of the present invention.

FIG. 1 is a block diagram showing a structure of a vehicle surroundings monitoring device in accordance with a first embodiment of the present invention. Referring to FIG. 1, a vehicle surroundings monitoring device mounted on a vehicle includes a radar 1 and a display 6. The radar 1 has a transmitting antenna 2 for radiating transmitted waves through a door mirror surface described below; a receiving antenna 3 for receiving, through the door mirror surface, reflected waves from an object existing near the vehicle; a high-frequency circuit unit 4 having a transmitting circuit for sending out transmitted waves and a receiving circuit supplied with received waves; and a signal processing circuit unit 5. Results of signal processing in the signal processing circuit 5 are displayed on the display 6 to provide information to a driver.

The radar 1 is mounted in a door mirror assembly of the vehicle, and the display 6 may be placed inside the vehicle or in the vicinity of the door mirror assembly.

Figure 2:
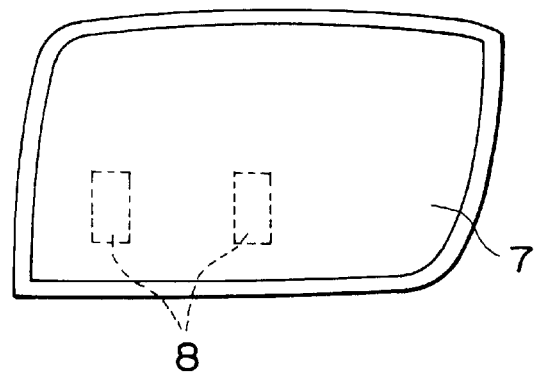
FIG. 2 is a diagram showing a door mirror surface in the first embodiment of the present invention.

Referring to FIG. 2, the structure seen from the door mirror surface side is illustrated. In FIG. 2, the door mirror surface is indicated by a reference numeral 7, opening surfaces for the transmitting antenna 2 and the receiving antenna 3 are indicated by a reference numeral 8. The transmitting antenna 2 and the receiving antenna 3 are placed on the back of the door mirror surface 7.

The operation of this embodiment will now be described.

Electric waves generated by the high-frequency circuit 4 are radiated out of the vehicle from the transmitting antenna 2 through the door mirror surface 7 and are reflected by an obstacle such as another vehicle existing near the vehicle having the monitoring device. The reflected waves enter the door mirror through the door mirror surface 7 to be received by the receiving antenna 3 and input to the high-frequency circuit unit 4. The received waves input to the high-frequency circuit unit 4 are down-converted into a low-frequency signal. This signal is input to the signal processing circuit 5, in which the distance to the obstacle, etc., are computed. If a risk of collision against the obstacle is thereby recognized, the driver is alerted to the risk by the display 6.

Figure 3:
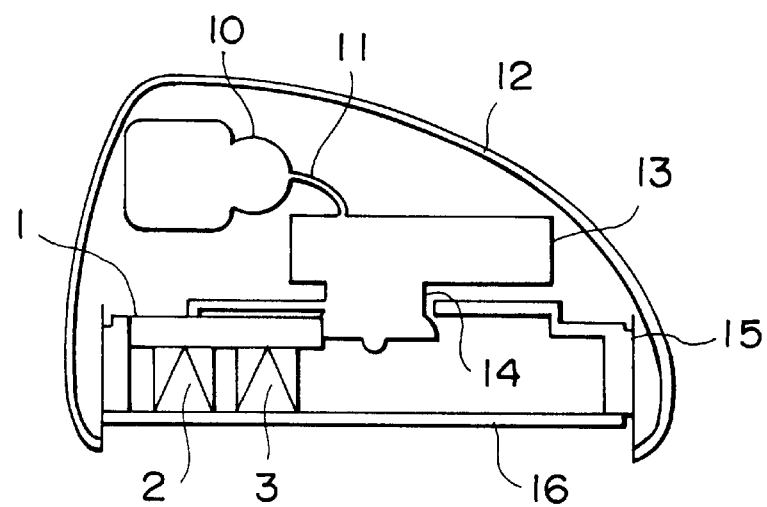
FIG. 3 is a diagram showing an internal structure of a door mirror assembly in the first embodiment of the present invention.

FIG. 3 is a diagram showing the internal structure of a door mirror assembly.

In FIG. 3, reference numerals respectively indicate a motor 10, a motor harness 11, a housing member 12, an actuator unit 13 as a drive unit for moving a door mirror, a connecting portion 14, a support portion 15, and a door mirror surface 16. A radar 1 is fixed in the support portion 15.

Figure 4:
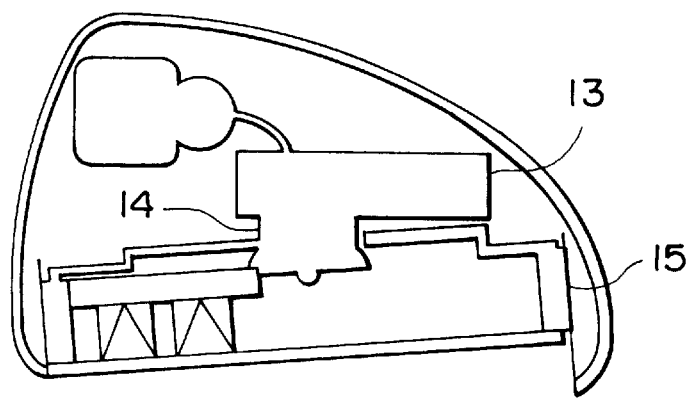
FIG. 4 is a diagram showing the rotation of a door mirror assembly in the first embodiment of the present invention.
Figure 5:
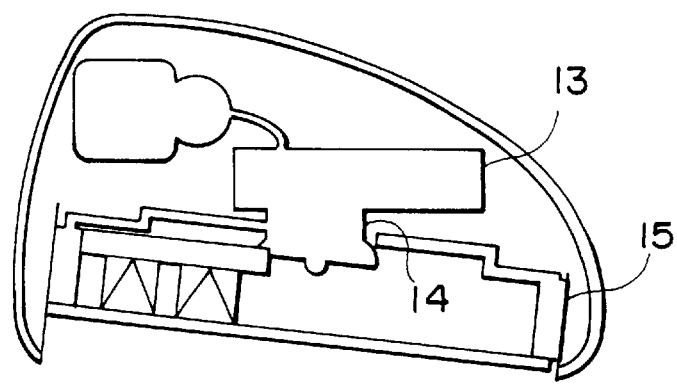
FIG. 5 is a diagram showing the rotation of a door mirror assembly in the first embodiment of the present invention.

In addition, FIGS. 4 and 5 are explanatory diagrams showing that the transmitting antenna 2, the receiving antenna 3 and the door mirror surface 16 are rotated while keeping a constant relative position. As shown in the figures, the support portion 15 is joined to the actuator unit 13 by the joint portion 14 and rotates vertically and horizontally with the joint portion 14 as a fulcrum. The transmitting antenna 2 and the receiving antenna 3 fixed to the support portion 15 rotate vertically and horizontally with the joint portion 14 as a fulcrum while the support portion 15 rotates.

As described above, according to the first embodiment, the angle of the door mirror surface 16 can be arbitrarily set while the relative position of the transmitting and receiving antennas 2 and 3 and the door mirror surface 16 is maintained constant.

Second Embodiment

A block diagram showing the structure of a second embodiment is identical with that of the first embodiment. Only differences from the first embodiment will be described below.

Figure 6:
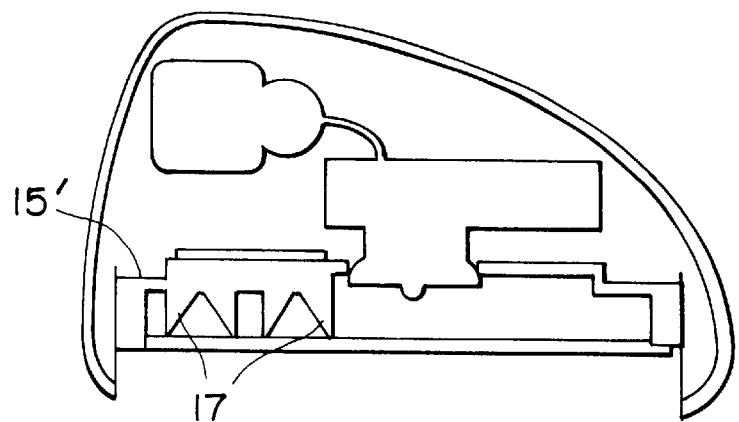
FIG. 6 is a diagram showing the internal structure of a door mirror in accordance with a second embodiment of the present invention.

FIG. 6 is a diagram showing the structure of the interior of a door mirror in accordance with the second embodiment.

As shown in FIG. 6, a support portion 15' according to the second embodiment has a structure in which the transmitting antenna 2, the receiving antenna 3 and the support portion 15 of the door mirror surface 16 according to the first embodiment are molded integrally.

In other words, the support portion 15' according to the second embodiment has an integral structure having the support portion 15, the transmitting antenna 2 and the receiving antenna 3, and the type of antenna may be any one of a phone antenna, a patch antenna, a reflector antenna and a lens antenna. An example shown in FIG. 6 exemplifies that of the phone antenna type. Also, in the support portion 15', a portion 17 that constitutes the antenna is made of a material used in an ordinary electromagnetic antenna such as iron, aluminum or magnesium. Further, only the portion thereof which becomes the antenna may be made of a resin that has been subjected to metal plating.

Third Embodiment

A block diagram showing the structure of a third embodiment is identical with those of the first and second embodiments. Only differences from the first and second embodiments will be described below.

Figure 7:
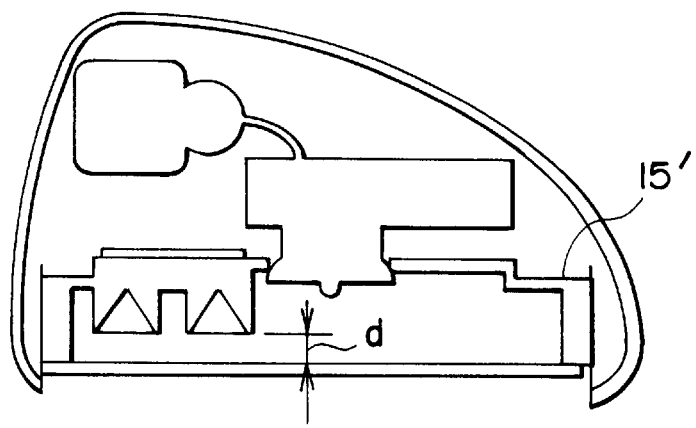
FIG. 7 is a diagram showing a door mirror assembly in accordance with a third embodiment of the present invention.

FIG. 7 is a diagram showing that the transmitting antenna and a transmitting antenna (17) are disposed at a distance d where the reflection from the door mirror surface 16 becomes minimum. The support portion and the antenna are molded integrally so that the distance d between the door mirror surface 16 and an antenna opening surface becomes optimum, to thereby structure a support portion 15' of the third embodiment. It is preferable that the distance d is set to $\lambda/2$ ($\lambda$ is a wavelength) or more.

As shown in FIG. 7, the distance d between the antenna and the door mirror surface is optimized, thereby being capable of suppressing to a certain level the electric wave components that stray into the receiving antenna due to the reflection of the electric waves radiated from the transmitting antenna by the door mirror surface, thus being capable of supplying accurate alarm information to a driver without deteriorating the distant measuring performance over a short distance.

As was described above, according to one aspect of the present invention, in the vehicle surroundings monitoring device which monitors surroundings of a vehicle, the device comprising: a transmitting antenna which is mounted in the interior of a door mirror of a vehicle and radiates transmitted waves through the surface of the door mirror; and a receiving antenna that receives reflective waves from an object existing near the vehicle through the surface of the door mirror, the transmitting antenna and the receiving antenna are rotated by a drive portion equipped within the door mirror to make variable the angle of the antenna equipped within the door mirror, thereby being capable of preventing the door mirror surface from being damaged due to a contact of the antenna with the door mirror.

Also, the transmitting antenna and the receiving antenna are fixed to a support portion that supports the surface of the door mirror, and the support portion is joined to the drive portion by a joint portion and rotates vertically and horizontally with the joint portion as a fulcrum, so that the transmitting antenna and the receiving antenna can be vertically and horizontally rotated with the joint portion as the fulcrum, thereby being capable of making variable the angle of the antenna equipped within the door mirror to prevent the door mirror surface from being damaged due to a contact of the antenna with the door mirror.

Also, the support portion of the door mirror surface, the transmitting antenna and the receiving antenna are molded integrally, thereby being capable of downsizing the device and improving the mounting property of the antenna in the door mirror.

Further, according to another aspect of the present invention, in the vehicle surroundings monitoring device which monitors surroundings of a vehicle, the device comprising: a transmitting antenna which is mounted in the interior of a door mirror of a vehicle and radiates transmitted waves through the surface of the door mirror; and a receiving antenna that receives reflective waves from an object existing near the vehicle through the surface of the door mirror, the support portion of the door mirror surface, the transmitting antenna and the receiving antenna are molded integrally, thereby being capable of downsizing the device and improving the mounting property of the antenna in the door mirror.

Still further, the transmitting antenna and the receiving antenna are disposed at positions where the reflection from the door mirror surface becomes minimum, thereby being capable of reducing the electric wave components that stray into the receiving antenna from the transmitting antenna to prevent the distance measuring performance over a short distance from being deteriorated.

Yet still further, a distance d of from the opening surfaces of the transmitting antenna and the receiving antenna to the door mirror surface is set to $\lambda/2$ (d is a wavelength) or more, thereby being capable of reducing electric wave components that stray into the receiving antenna from the transmitting antenna to prevent the distance measuring performance over a short distance from being deteriorated.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A vehicle surroundings monitoring device which monitors surroundings of a vehicle, said device comprising:

a transmitting antenna which is mounted in the interior of a door mirror of the vehicle and radiates transmitted waves through the surface of said door mirror; and a receiving antenna that receives reflective waves from an object existing near the vehicle through the surface of said door mirror, wherein said transmitting antenna and said receiving antenna are rotated by a drive portion equipped within said door mirror, and wherein a distance d from the opening surfaces of said transmitting antenna and said receiving antenna to the door mirror surface is set to $\lambda/2$ ($\lambda$ is a wavelenght) or more so that a reflection from the door mirror surface becomes small.

2. A vehicle surroundings monitoring device as claimed in claim 1, wherein said transmitting antenna and said receiving antenna are fixed to a support portion that supports the surface of said door mirror; and wherein said support portion is joined to the drive portion by a joint portion and rotates vertically and horizontally with the joint portion as a fulcrum, to thereby vertically and horizontally rotate said transmitting antenna and said receiving antenna with the joint portion as the fulcrum.

3. A vehicle surroundings monitoring device as claimed in claim 2, wherein said support portion of said door mirror surface, said transmitting antenna and said receiving antenna are molded integrally.

4. A vehicle surroundings monitoring device which monitors surroundings of a vehicle, said device comprising:

a transmitting antenna which is mounted in the interior of a door mirror of a vehicle and radiates transmitted waves through the surface of said door mirror; and a receiving antenna that receives reflective waves from an object existing near the vehicle through the surface of said door mirror, wherein a support portion of said door mirror surface, said transmitting antenna and said receiving antenna are molded integrally, and wherein a distance d from the opening surfaces of said transmitting antenna and said receiving antenna to the door mirror surface is set to $\lambda/2$ ($\lambda$ is a wavelenght) or more so that a reflection from the door mirror surface becomes small.

* * * * *